United States Patent
Gergis

(10) Patent No.: US 11,427,053 B2
(45) Date of Patent: Aug. 30, 2022

(54) REVERSIBLE REFRIGERATION CYCLE SYSTEM WITH RE-HEAT CAPABILITY FOR USE WITH VEHICLES

(71) Applicant: Mobile Climate Control, Corp., Goshen, IN (US)

(72) Inventor: Adel Gergis, York, PA (US)

(73) Assignee: Mobile Climate Control, Corp., Goshen, IN (US)

( * ) Notice: Subject to any disclaimer, the term of this patent is extended or adjusted under 35 U.S.C. 154(b) by 58 days.

(21) Appl. No.: 17/073,958

(22) Filed: Oct. 19, 2020

(65) Prior Publication Data

US 2021/0114435 A1 Apr. 22, 2021

Related U.S. Application Data

(60) Provisional application No. 62/916,567, filed on Oct. 17, 2019.

(51) Int. Cl.
*B60H 1/32* (2006.01)
*B60H 1/00* (2006.01)

(52) U.S. Cl.
CPC ....... *B60H 1/3205* (2013.01); *B60H 1/00371* (2013.01); *B60H 1/00392* (2013.01); *B60H 1/00485* (2013.01); *B60H 1/3222* (2013.01); *B60H 1/3227* (2013.01); *B60H 2001/3292* (2013.01)

(58) Field of Classification Search
CPC .............. B60H 1/3205; B60H 1/00371; B60H 1/00392; B60H 1/00485; B60H 1/3222; B60H 1/3227; B60H 2001/3292
See application file for complete search history.

(56) References Cited

U.S. PATENT DOCUMENTS

| | | | |
|---|---|---|---|
| 7,231,776 B2* | 6/2007 | Casar | B60H 1/00899 62/244 |
| 9,242,527 B2* | 1/2016 | Graaf | B60H 1/143 |
| 10,870,332 B2* | 12/2020 | Ishizeki | B60H 1/00978 |
| 2020/0269654 A1* | 8/2020 | Schroeder | F25B 29/00 |

* cited by examiner

*Primary Examiner* — Marc E Norman
(74) *Attorney, Agent, or Firm* — Barnes & Thornburg LLP

(57) ABSTRACT

A reversible refrigeration cycle system is configured to provide heating and cooling to condition passenger air for a vehicle such as, for example, a bus. The reversible refrigeration cycle system includes a storage tank for storing fluid, a compressor, a plurality of coils, and valves for selectively conducting the fluid to the plurality of coils.

19 Claims, 5 Drawing Sheets

REVERSIBLE REFRIGERATION CYCLE SYSTEM WITH RE-HEAT CAPABILITY FOR USE WITH VEHICLES

CROSS REFERENCE TO RELATED APPLICATIONS

This application claims priority to and the benefit of U.S. Provisional Patent Application No. 62/916,567, filed 17 Oct. 2019, the disclosure of which is now expressly incorporated herein by reference.

FIELD OF THE DISCLOSURE

The present disclosure relates generally to refrigeration cycle systems and more specifically to refrigeration cycle systems for use with vehicles such as buses and coaches.

BACKGROUND

Refrigeration cycle systems may be used to condition the air within a vehicle such as, for example, a bus, coach, truck, trailer, car, or shipping container. The refrigeration cycle systems have been conventionally powered by an internal combustion engine which may provide a heat source for heating the conditioned air. As some vehicles move to electric or hybrid power sources, alternative heat sources and refrigeration cycle systems may be desired.

SUMMARY

The present disclosure may comprise one or more of the following features and combinations thereof.

According to an aspect of the disclosure, a refrigeration system may be adapted for use with a vehicle such as a bus or coach. The refrigeration system may use two indoor coils. The first indoor coil may be used for cooling and the second indoor coil may be used for heating. The features of the present disclosure may simplify plumbing, allow optimization of both indoor coils, and may eliminate the use of some types of valves used in conventional systems. The features of the present disclosure may also provide waste-heat recovery. This may optionally allow using the heat in the hot gas (waste-heat) for the purpose of re-heat (both for de-humidification and capacity control) during the cooling mode.

According to another aspect of the present disclosure, a reversible refrigeration cycle system for use with a vehicle may include a storage tank, a compressor, a three-way valve, and a plurality of coils. The plurality of coils may include a first indoor coil, a second indoor coil, and an outdoor coil. The storage tank has an entry and an exit. The compressor has an inlet and an outlet. The three-way valve has an inlet, a first outlet, and a second outlet.

The first indoor coil and the second indoor coil may be configured to condition air ducted to a passenger compartment of the vehicle. The first indoor coil may have a first connection fluidly connected with the exit of the storage tank and a second connection fluidly connected with the inlet of the compressor. The second indoor coil may have a first connection fluidly connected with the second outlet of the three-way valve and a second connection fluidly connected with the entry of the storage tank. The outdoor coil may be in fluid communication with an ambient environment surrounding the vehicle. The outdoor coil may have a first connection fluidly connected with the first outlet of the three-way valve and a second connection fluidly connected with the entry of the storage tank.

These and other features of the present disclosure will become more apparent from the following description of the illustrative embodiments.

DETAILED DESCRIPTION OF THE DRAWINGS

Figure 1:
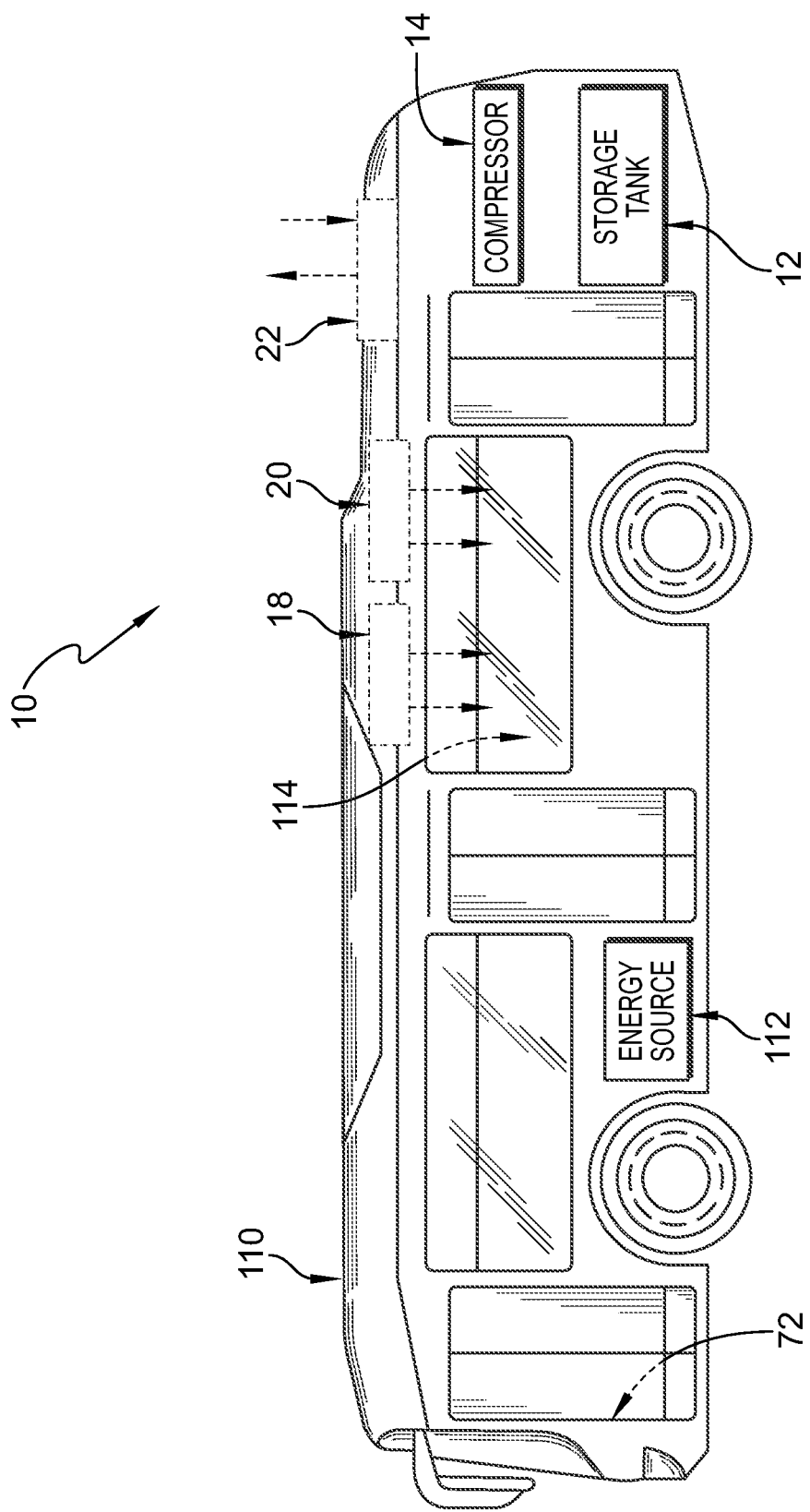
FIG. 1 is a diagrammatic view of a reversible refrigeration cycle system in accordance with the present disclosure integrated into a vehicle such as a bus.

For the purposes of promoting an understanding of the principles of the disclosure, reference will now be made to a number of illustrative embodiments illustrated in the drawings and specific language will be used to describe the same.

Figure 2:
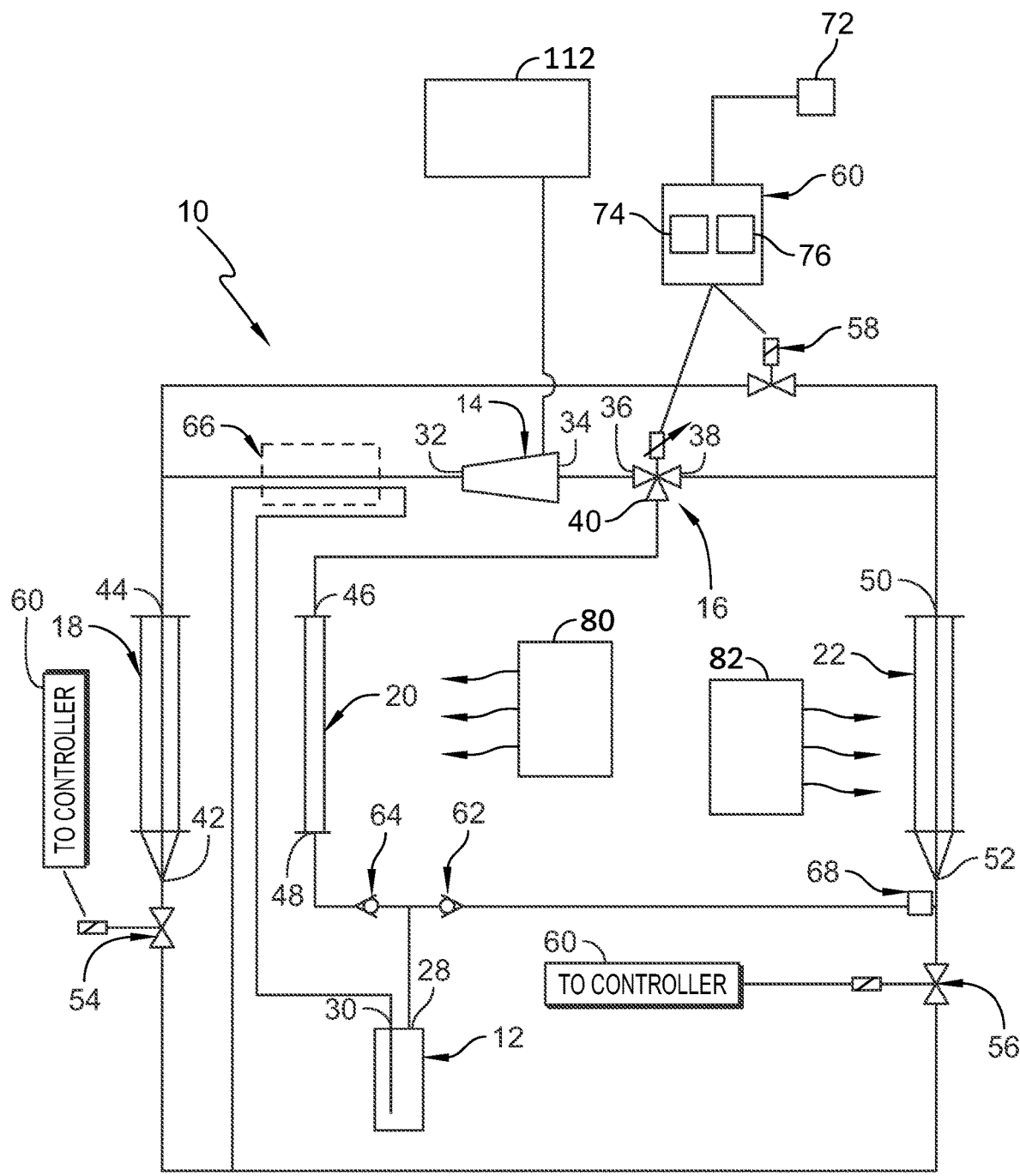
FIG. 2 is a diagrammatic view of the reversible refrigeration cycle system.

A reversible refrigeration cycle system 10 for use with a vehicle 110 is shown in FIGS. 1-5. The schematic of FIG. 2 represents the refrigeration cycle system 10 that can both i) be reversed in order to operate as a heat-pump and ii) use a part of the hot-gas as a heat source for re-heat in a cooling mode of the system 10. The present disclosure provides a system 10 that uses two indoor coils (condenser and/or evaporator coils) in some embodiments, a first indoor coil dedicated for cooling and a second indoor cooling used for heating.

The system 10 may provide a number of benefits as compared to conventional refrigeration and heat pump systems. The features of the system 10 may simplify plumbing and allow each of the two indoor coils to be optimally designed for their purpose (each for its purpose of cooling or heating, including the air flow direction). The illustrative embodiment of system 10 does not include a four-way (reverse flow) valve. In conventional systems, the four-way valve may be the most unreliable component in a conventional heat pump as well as it is not usually designed with transit applications in mind.

The features of the present disclosure may also provide waste-heat recovery. This may optionally allow the heat in the hot gas (waste-heat) to be used for the purpose of re-heat (both for de-humidification and capacity control) during the cooling mode. This may be beneficial for Electric Vehicles (EV) where using resistive heat may be wasteful and cause a significant reduction of the range of the vehicle.

The reversible refrigeration cycle system 10 is adapted for use with a vehicle 110 such as, for example, a bus or a coach. As such, the system 10 may be coupled with the vehicle 110 for movement therewith and components of the system 10 may be powered by the vehicle. In the illustrative embodiment, the vehicle 110 is an electric powered bus 110 and the electronic components of the system 10 are powered by an electric energy source 112 such as a battery or capacitor included in the bus 110.

Figure 3:
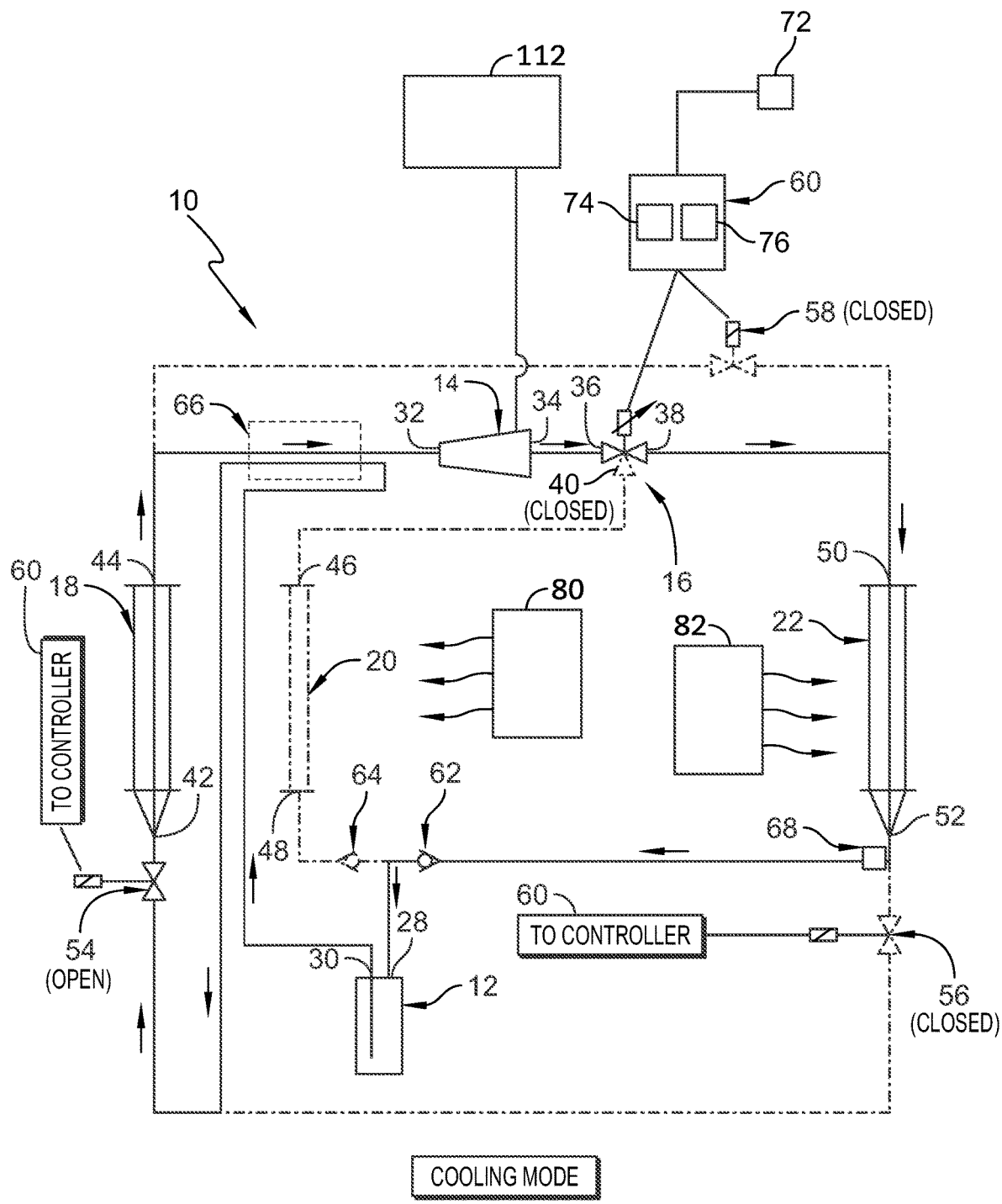
FIG. 3 is a diagrammatic view of the reversible refrigeration cycle system in a cooling mode.
Figure 4:
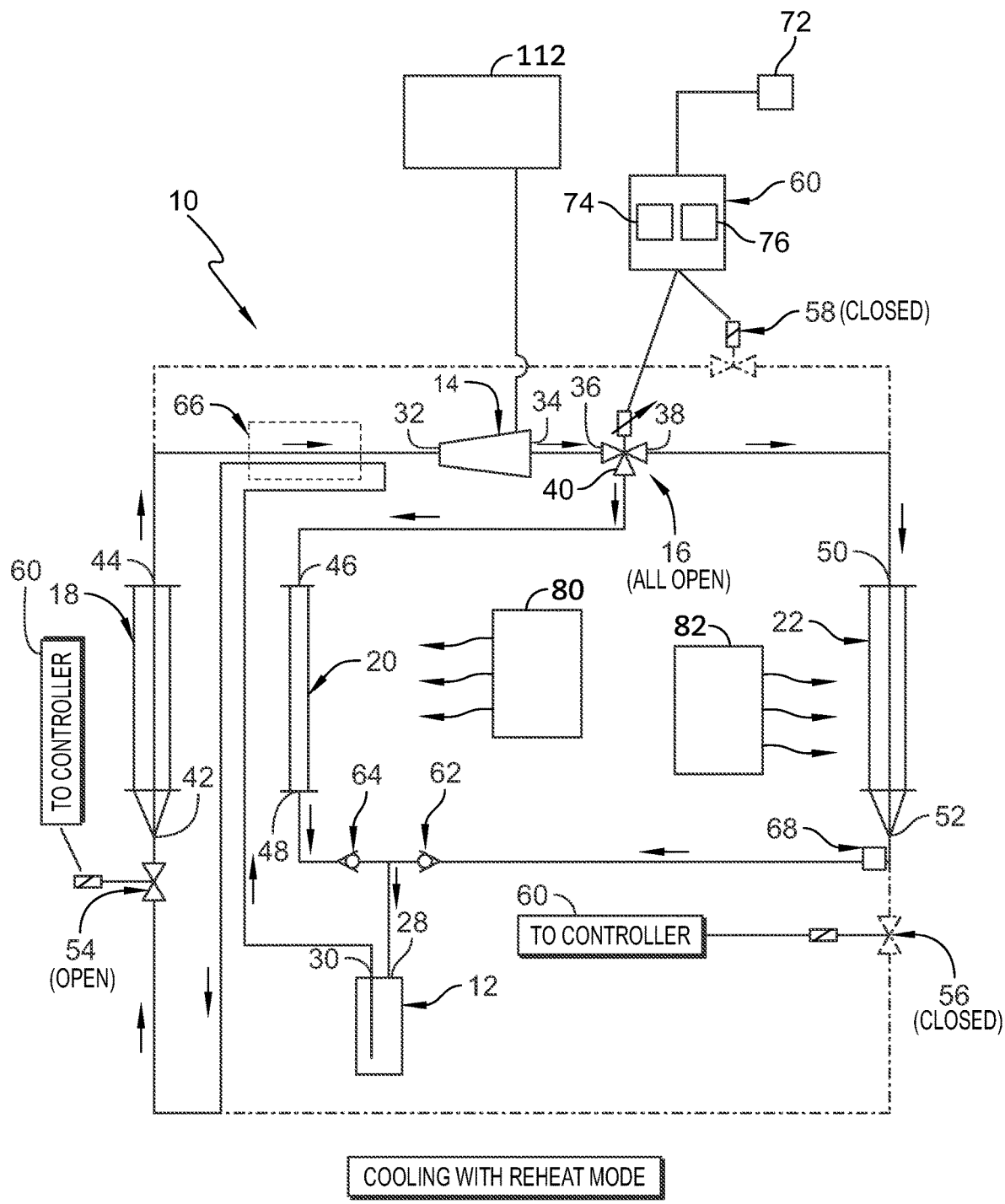
FIG. 4 is a diagrammatic view of the reversible refrigeration cycle system in a cooling with re-heat mode.
Figure 5:
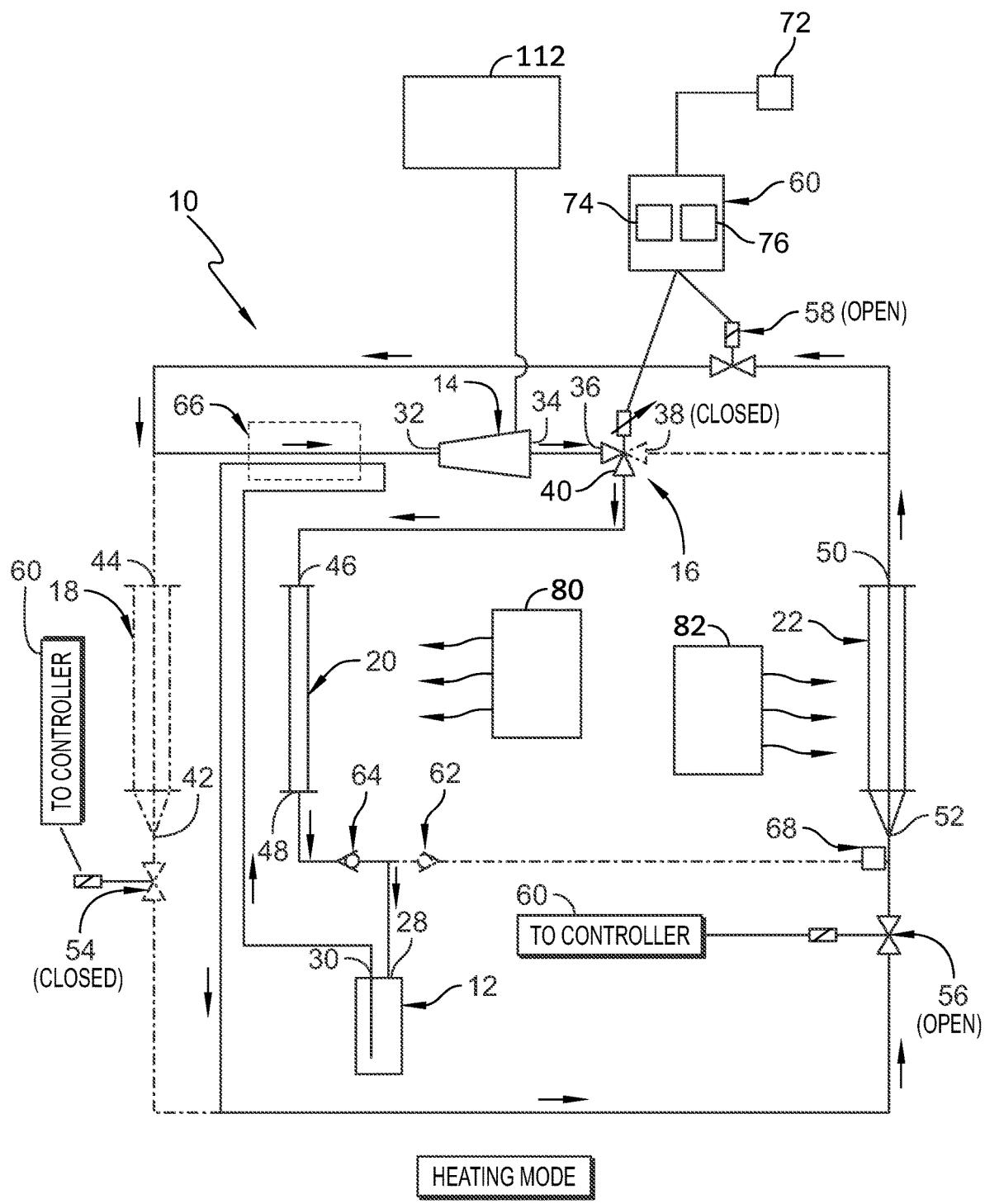
FIG. 5 is a diagrammatic view of the reversible refrigeration cycle system in a heating mode.

The system 10 is configured to operate selectively in one of a cooling mode as suggested in FIG. 3, a cooling with re-heat mode as suggested in FIG. 4, and a heating mode as suggested in FIG. 5. The system 10 provides heating and cooling without using resistive heating in illustrative embodiments.

The system 10 includes a storage tank 12, a compressor 14, a three-way valve 16, a first indoor coil 18, a second indoor coil 20, and an outdoor coil 22 as shown in FIGS. 1 and 2. The storage tank 12 has an entry 28 and an exit 30. The compressor 14 has an inlet 32 and an outlet 34. The three-way valve 16 has an inlet 36, a first outlet 38, and a second outlet 40. The three-way valve may be a T port valve in some embodiments. In some embodiments, the storage tank 12 is a reservoir in other embodiments the storage tank 12 is incorporated into the conduit leading to the first indoor coil 18 and the outdoor coil 22.

The first indoor coil 18 is configured to condition air ducted to a passenger compartment 114 of the vehicle 110 as suggested in FIG. 1. The first indoor coil 18 is adapted to cool the air and provide cooling to the passenger compartment 114. The first indoor coil 18 is used only for cooling in the illustrative embodiment such that the coil 18 can be designed to optimize cooling. In contrast, some refrigeration and heat pump system use a single coil for heating and cooling such that the coil is designed with compromises to help heating and cooling without being optimized for either heating or cooling.

The first indoor coil 18 has a first connection 42 and a second connection 44 as shown in FIG. 2. The first connection 42 is fluidly connected with the exit 30 of the storage tank 12. The second connection 44 of the first indoor coil 18 is fluidly connected with the inlet 32 of the compressor 14. The first indoor coil 18 is configured to have fluid enter into the first connection 42 and exit via the second connection 44 any time the first indoor coil 18 is in use, such as in the cooling mode and the cooling with re-heat mode.

The second indoor coil 20 is configured to condition air ducted to the passenger compartment 114 of the vehicle 110 as suggested in FIG. 1. The second indoor coil 20 is adapted to heat the air and provide heating to the passenger compartment 114. The second indoor coil 20 is used only for heating in the illustrative embodiment such that the coil can be designed to optimize for heating.

The second indoor coil 20 has a first connection 46 and a second connection 48 as shown in FIG. 2. The first connection 46 of the second indoor coil 20 is fluidly connected with the second outlet 40 of the three-way valve 16. The second connection 48 is fluidly connected with the entry 28 of the storage tank 12.

The outdoor coil 22 is in fluid communication with ambient environment surrounding the vehicle 110 as suggested in FIG. 1. The outdoor coil 22 is adapted to receive heat from the ambient environment in some operation modes of system 10 and to reject heat to the ambient environment in other operation modes of system 10. The outdoor coil 22 has a first connection 50 and a second connection 52 as shown in FIG. 2. The first connection 50 of the outdoor coil 22 is fluidly connected with the first outlet 38 of the three-way valve 16. The second connection 52 of the outdoor coil 22 is fluidly connected with the entry 28 of the storage tank 12. The second connection 52 of the outdoor coil 22 is also fluidly connected to a second expansion valve 56 and then to the entry 28 of the storage tank 12.

The reversible refrigeration cycle system 10 further includes a first expansion valve 54, the second expansion valve 56, a shutoff valve 58, a controller 60, a first check valve 62 (one-way valve), and a second check valve 64 (one-way valve). The system 10 further includes a heat exchanger 66 as shown in FIG. 2. The system 10 may optionally include another valve 68 or wye connection 68.

The first expansion valve 54 is fluidly connected between the first connection 42 of the first indoor coil 18 and the exit 30 of the storage tank 12 as shown in FIG. 2. The first expansion valve 54 is movable between an open position and a closed position. The second expansion valve 56 is fluidly connected between the second connection 52 of the outdoor coil 22 and the exit 30 of the storage tank 12. The second expansion valve 56 is movable between an open position and a closed position. The shutoff valve 58 is fluidly connected between the first connection 50 of the outdoor coil 22 and the inlet 32 of the compressor 14. The shutoff valve 58 is movable between an open position and a closed position. The shutoff valve 58 includes a two-way solenoid valve in the illustrative embodiment.

The controller 60 is configured to operate the system 10 in one of a cooling mode, a cooling with re-heat mode, and a heating mode as suggested in FIGS. 3-5. The controller 60 is connected to the three-way valve 16, the first expansion valve 54, the second expansion valve 56, and the shutoff valve 58 as suggested in FIG. 2. The controller 60 is configured to selectively open and close each of the three-way valve 16, the first expansion valve 54, the second expansion valve 56, and the shutoff valve 58 individually. In other embodiments, the three-way valve 16, the first expansion valve 54, the second expansion valve 56, and the shutoff valve 58 are operated manually, mechanically, thermostatically, or by any other control mechanism.

The controller 60 is configured to receive input and to open and close the valves 16, 54, 56, 58 to operate the system 10 in one of the modes in response to receiving the input. Illustratively, the input is an electric signal that is generated by the operator of the vehicle selecting the cooling mode, cooling with re-heat mode, or heating mode on a user interface 72 in the vehicles. Such user interface 72 may be a knob, button, switch, graphical user interface, an combination thereof, or any other suitable input device. The user interface 72 is integrated into the operator control area of the vehicle 110 in illustrative embodiments.

The first check valve 62 is fluidly connected between the second connection 52 of the outdoor coil 22 and the entry 28 of the storage tank 12 as shown in FIG. 2. The first check valve 62 allows fluid to flow from the outdoor coil 22 to the storage tank 12, but blocks fluid from flowing through the second check valve 64 in the reverse direction and toward the second connection 52 of the outdoor coil 22.

The second check valve 64 is fluidly connected between the second connection 48 of the second indoor coil 20 and the entry 28 of the storage tank 12 as shown in FIG. 2. The second check valve 64 allows fluid to flow from the second indoor coil 20 into the storage tank 12, but blocks fluid from flowing in the reverse direction through the second check valve 64 and into the second connection 48 of the second indoor coil 20.

The heat exchanger 66 is optional and allows heat in liquid flowing from the storage tank 12 to be rejected into the vapor flowing to the inlet 32 of the compressor 14 as suggested in FIGS. 2 and 4. Such heat rejection may be desired in the cooling with re-heat mode. The heat exchanger 66 is formed by physically engaging the conduits carrying the fluid so that the heat is transferred via conduction in the illustrative embodiment. The conduits are bonded to one another in the illustrative embodiment. In other embodiments, a heat exchanger unit may be used such as a shell and tube, fin, parallel flow, counter-flow, cross-flow, plate, or any other suitable alternative. A means of by-pass of such heat exchanger (if existent) may be added (on either the liquid, or gas sided, or both) in order to control the heat exchange through that heat exchanger, or eliminate it, if desired.

The system 10 may further include the valve 68, wye connection 68, or any other suitable alternative for controlling fluid flow as shown in FIG. 2. The valve 68 is configured to allow fluid to flow from the second connection 52 of the outdoor coil 22 toward the first check valve 62 and entry 28 of the storage tank 12, but blocks fluid flow from flowing from the second expansion valve 56 toward the conduit with the first check valve 62 and entry 28 of the storage tank 12. This may be helpful, for example, in the heating mode shown in FIG. 5 to block recirculation as fluid is directed out of the second expansion valve 56 toward the second connection 52 of the outdoor coil 22.

In some embodiments, the system 10 includes a blower 80 configured to direct air over the first indoor coil 18 and the second indoor coil 20. In some embodiments, the system 10 includes one or more blowers 80 for each of the indoor coils 18, 20. The system 10 may include one or more blowers 82 for directing air over the outdoor coil 22.

The system 10 is shown in a configuration for operating in the cooling mode in FIG. 3. In the cooling mode, the controller 60 opens the first expansion valve 54, closes the second expansion valve 56, closes the shutoff valve 58, blocks fluid flow through the second outlet 40 of the three-way valve 16, and allows fluid flow through the inlet 36 and the first outlet 38 of the three-way valve 16.

In the cooling mode, fluid is conducted from the exit 30 of the storage tank 12, through the first expansion valve 54 and into the first connection 42 of the first indoor coil 18 as suggested in FIG. 3. Air is blown across the first indoor coil 18 to provide cooled conditioned air that is conducted into the passenger compartment 114 of the vehicle 110. The fluid exits the second connection 44 of the first indoor coil 18 and enters the inlet 32 of the compressor 14. The fluid moving to the inlet 32 may cool the fluid flowing from the storage tank 12 to the first indoor coil 18 via the heat exchanger 66.

The compressor 14 compresses the fluid and the compressed fluid flows through the inlet 36 of the three-way valve 16 and out of the first outlet 38 of the three-way valve as shown in FIG. 3. The fluid enters the first connection 50 of the outdoor coil 22 and exits the second connection 52 of the outdoor coil 22. The fluid may reject heat to the ambient outdoor environment while flowing through the outdoor coil 22. The fluid then passes through the first check valve 62 and into the entry 28 of the storage tank 12.

The system 10 is shown in a configuration for operating in the cooling with re-heat mode in FIG. 4. In the cooling with re-heat mode, the controller 60 opens the first expansion valve 54, closes the second expansion valve 56, closes the shutoff valve 58, and allows fluid flow through the inlet 36, the first outlet 38, and the second outlet 40 of the three-way valve 16.

In the cooling with re-heat mode, fluid is conducted from the exit 30 of the storage tank 12, through the first expansion valve 54 and into the first connection 42 of the first indoor coil 18 as suggested in FIG. 4. Air is blown across the first indoor coil 18 to provide cooled conditioned air that is conducted into the passenger compartment 114 of the vehicle 110. The fluid exits the second connection 44 of the first indoor coil 18 and enters the inlet 32 of the compressor 14. The fluid moving to the inlet 32 may cool the fluid flowing from the storage tank 12 to the first indoor coil 18 via the heat exchanger 66.

The compressor 14 compresses the fluid and the compressed fluid flows through the inlet 36 of the three-way valve 16 and a portion of the fluid flows out of the first outlet 38 of the three-way valve as shown in FIG. 4. The fluid enters the first connection 50 of the outdoor coil 22 and exits the second connection 52 of the outdoor coil 22. The fluid may reject heat to the ambient outdoor environment in the outdoor coil 22. The fluid then passes through the first check valve 62 and into the entry 28 of the storage tank 12.

Another portion of the compressed fluid from the outlet 34 of the compressor 14 flows out of the second outlet 40 of the three-way valve 16 and into the first connection 46 of the second indoor coil 20 as suggested in FIG. 4. The fluid then flows out of the second connection 48 of the second indoor coil 20, through the second check valve 64, and into the entry 28 of the storage tank 12. Air is blown across the second indoor coil 20 to extract heat from the fluid in the second indoor coil 20 and provide heated conditioned air.

The heated conditioned air is directed into the passenger compartment 114 of the vehicle 110. Though the system 10 is providing cooling during this mode, this re-heat may be useful to remove moisture from the air in the passenger compartment 114 even though a net cooled air (not warm air) is desired and provided. That is, the cooled air from the first indoor coil 18 may provide more cooling than the second indoor coil 20 provides heating. The second outlet 40 and/or the three-way valve 16 may be modulated by the controller 60 to control the flow and amount of re-heat generated by the second indoor coil 20. In some embodiments, another controller is located downstream of the second outlet 40 to modulate the flow rate of the fluid.

The system 10 is shown in a configuration for operating in the heating mode in FIG. 5. In the heating mode, the controller 60 closes the first expansion valve 54, opens the second expansion valve 56, opens the shutoff valve 58, and blocks fluid flow through the first outlet 38 of the three-way valve 16 while allowing fluid flow through the inlet 36 and the second outlet 40 of the three-way valve 16.

In the heating mode, fluid is conducted from the entry 28 of the storage tank 12, through the second expansion valve 56 and into the second connection 52 of the outdoor coil 22 as suggested in FIG. 5. Heat may be added from the ambient environment to the fluid in the outdoor coil 22 by the ambient environment heating the outdoor coil 22. The fluid exits the first connection 50 of the outdoor coil 22 and passes through the shutoff valve 58 and enters the inlet 32 of the compressor 14. The fluid may gain heat from the fluid flowing from the storage tank 12 via the heat exchanger 66.

The compressor 14 compresses the fluid and the fluid is conducted into the inlet 36 of the three-way valve 16 and through the second outlet 40 to the first connection 46 of the second indoor coil 20. The fluid is conducted out of the second connection 48 of the second indoor coil 20, through the second check valve 64, and into the entry 28 of the storage tank 12. Air is blown across the second indoor coil 20 to extract heat from the fluid in the second indoor coil 20 and heat and condition the air. The heated air is conducted into the passenger compartment 114 to heat the passenger compartment.

Electronic expansion valves (stepper-motor) 54, 56 may be used for both fine control of superheat as well as serving as shut-off valves when desired. Even still, other expansion devises, e.g. thermostatic expansion valves may be used and the shut-off function achieved of the valves 54, 56 may be achieved by another device, e.g. solenoid valve.

In the illustrative embodiment, the compressor 14 is powered by the electric energy source 112. The amount of electric energy supplied to the compressor 14 can vary based on the operation mode of the system 10 and the amount of heating or cooling requested by the operator via the user interface 72. The controller 60 may be connected to the compressor 14 and/or the energy source 112. The controller may be configured to control the energy supplied to the compressor 14.

The controller 60 includes a processor 74 and a memory 76 connected with the processor 74. The memory 76 includes instructions stored therein that cause the processor 74 to actuate the three-way valve 16 to i) fluidly connect the compressor 14 with the outdoor coil 22 and block fluid communication between the compressor 14 and the second indoor coil 20 in cooling mode of operation, ii) fluidly connect the compressor 14 with the outdoor coil 22 and fluidly connect the compressor 14 and the second indoor coil 20 in a cooling with re-heat mode of operation, and iii) fluidly connect the compressor 14 with second indoor coil 20 and block fluid communication from the compressor 14 to the outdoor coil 22 in a heating mode of operation. The memory 76 further including instructions to cause the processor 74 to control the valves 54, 56, 58 as discussed above to change the operation mode of the system 10. The controller 60 is configured to change the operation mode of the system 10 in response to receiving instructions from the user interface 72.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A refrigeration cycle system for use with a vehicle, the refrigeration cycle system comprising:
    a storage tank having an entry and an exit,
    a compressor having an inlet and an outlet,
    a three-way valve having an inlet, a first outlet, and a second outlet,
    a first indoor coil configured to condition air ducted to a passenger compartment of the vehicle, the first indoor coil having a first connection fluidly connected with the exit of the storage tank and a second connection fluidly connected with the inlet of the compressor,
    a second indoor coil configured to condition the air ducted to the passenger compartment of the vehicle, the second indoor coil having a first connection fluidly connected with the second outlet of the three-way valve and a second connection fluidly connected with the entry of the storage tank, and
    an outdoor coil in fluid communication with an ambient environment surrounding the vehicle, the outdoor coil having a first connection fluidly connected with the first outlet of the three-way valve and a second connection fluidly connected with the entry of the storage tank,
    further comprising a first expansion valve fluidly connected between the first connection of the first indoor coil and the storage tank, a second expansion valve fluidly connected between the second connection of the outdoor coil and the exit of the storage tank, and a shutoff valve fluidly connected between the first connection of the outdoor coil and the inlet of the compressor.

2. The refrigeration cycle system of claim 1, further comprising a controller configured to operate the refrigeration cycle system in one of a cooling mode, a cooling with re-heat mode, and a heating mode.

3. The refrigeration cycle system of claim 2, wherein the controller is configured to open the first expansion valve, close the second expansion valve, close the shutoff valve, block fluid flow through the second outlet of the three-way valve, and allow fluid flow through the inlet and the first outlet of the three-way valve to operate the refrigeration cycle system in the cooling mode.

4. The refrigeration cycle system of claim 2, wherein the controller is configured to open the first expansion valve, close the second expansion valve, close the shutoff valve, and allow fluid flow through the inlet, the first outlet, and the second outlet of the three-way valve to operate the refrigeration cycle system in the cooling with re-heat mode.

5. The refrigeration cycle system of claim 2, wherein the controller is configured to close the first expansion valve, open the second expansion valve, open the shutoff valve, and block fluid flow through the first outlet of the three-way valve while allowing fluid flow through the inlet and the second outlet of the three-way valve to operate the refrigeration cycle system in the heating mode.

6. The refrigeration cycle system of claim 1, wherein the shutoff valve is a two-way solenoid valve.

7. The refrigeration cycle system of claim 1, further comprising a first check valve connected between the second connection of the outdoor coil and the entry of the storage tank.

8. The refrigeration cycle system of claim 7, further comprising a second check valve connected between the second connection of the second indoor coil and the entry of the storage tank.

9. The refrigeration cycle system of claim 1, further comprising a heat exchanger configured to transfer heat between fluid flowing from the storage tank toward one of the first indoor coil and the outdoor coil and the fluid flowing from one of the first indoor coil and the outdoor coil to the inlet of the compressor.

10. A refrigeration cycle system for use with a vehicle, the refrigeration cycle system comprising:
    a storage tank,
    a compressor,
    a three-way valve,
    a first coil having a first connection fluidly connected with the storage tank and a second connection fluidly connected with the compressor,
    a second coil having a first connection fluidly connected with the three-way valve and a second connection fluidly connected with the storage tank, and
    a third coil in fluid communication with an ambient environment surrounding the vehicle, the third coil having a first connection fluidly connected with the three-way valve and a second connection fluidly connected with the storage tank,
    further comprising a heat exchanger configured to transfer heat between fluid flowing from the storage tank toward one of the first coil and the third coil and the fluid flowing from one of the first coil and the third coil to an inlet of the compressor.

11. The refrigeration cycle system of claim 10, wherein the third coil is fluidly connected with an entry of the storage tank and with an exit of the storage tank.

12. The refrigeration cycle system of claim 10, further comprising a controller connected with the three-way valve and including a processor and memory having stored therein instructions to cause the processor to actuate the three-way valve to i) fluidly connect the compressor with the third coil and block fluid communication between the compressor and the second coil in a first mode of operation, ii) fluidly connect the compressor with the third coil and fluidly connect the compressor and the second coil in a second mode of operation, and iii) fluidly connect the compressor with the second coil and block fluid communication between the compressor and the third coil in a third mode of operation.

13. The refrigeration cycle system of claim 10, further comprising a first expansion valve fluidly connected between the first coil and the storage tank, a second expansion valve fluidly connected between the third coil and the storage tank, and a shutoff valve fluidly connected between the third coil and an inlet of the compressor.

14. The refrigeration cycle system of claim 10, further comprising a first expansion valve fluidly connected between the first coil and the storage tank, a second expansion valve fluidly connected between the third coil and the storage tank, and a shutoff valve fluidly connected between the third coil and an inlet of the compressor.

15. The refrigeration cycle system of claim 10, wherein the compressor is connected with an electric energy source configured to power the compressor.

16. A method comprising:
fluidly connecting a first connection of a first coil with an exit of a storage tank and a second connection of the first coil with an inlet of a compressor,
fluidly connecting an outlet of the compressor with an inlet of a three-way valve,
fluidly connecting a first connection of a second coil with a first outlet of the three-way valve and a second connection of the second coil with an entry of the storage tank,
fluidly connecting a first connection of a third coil with a second outlet of the three-way valve and a second connection of the third coil with the entry of the storage tank,
fluidly connecting a first expansion valve between the first connection of the first indoor coil and the exit of the storage tank,
fluidly connecting a second expansion valve fluidly between the second connection of the outdoor coil and the exit of the storage tank, and
fluidly connecting a shutoff valve between the first connection of the outdoor coil and the inlet of the compressor,
wherein the three-way valve is configured to selectively i) fluidly connect the compressor with the second coil and to block fluid flow from the compressor to the third coil, ii) fluidly connect the compressor with the second coil and the third coil, and iii) fluidly connect the compressor with the third coil and to block fluid flow from the compressor to the second coil.

17. The method of claim 16, further comprising connecting a controller to the three-way valve,
operating the three-way valve to fluidly connect the compressor with the second coil and to block fluid flow from the compressor to the third coil in response to the controller receiving instructions to operate in a heating mode,
operating the three-way valve to fluidly connect the compressor with the second coil and the third coil in response to the controller receiving instructions to operate in a cooling with re-heat mode, and
operating the three-way valve to fluidly connect the compressor with the third coil and to block fluid flow from the compressor to the second coil in response to the controller receiving instructions to operate in a cooling mode.

18. The method of claim 16, further comprising connecting the compressor with an electric energy source included on a transportation vehicle and the electric energy source configured to power the compressor using electric energy.

19. The method of claim 16, further comprising transferring heat between fluid flowing from the storage tank toward one of the first coil and the third coil and the fluid flowing from one of the first coil and the third coil to the inlet of the compressor.

* * * * *